United States Patent
Thom et al.

(10) Patent No.: US 10,218,696 B2
(45) Date of Patent: Feb. 26, 2019

(54) TARGETED SECURE SOFTWARE DEPLOYMENT

(71) Applicant: Microsoft Technology Licensing, LLC, Redmond, WA (US)

(72) Inventors: Stefan Thom, Snohomish, WA (US); Merzin Kapadia, New Castle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 15/198,336

(22) Filed: Jun. 30, 2016

(65) Prior Publication Data
US 2018/0007040 A1 Jan. 4, 2018

(51) Int. Cl.
*H04L 29/06* (2006.01)
*G06F 21/57* (2013.01)

(52) U.S. Cl.
CPC .......... *H04L 63/0853* (2013.01); *G06F 21/57* (2013.01); *G06F 21/575* (2013.01); *H04L 63/0435* (2013.01); *H04L 63/0442* (2013.01); *H04L 63/061* (2013.01)
(Continued)

(58) Field of Classification Search
CPC ... G06F 21/57; G06F 21/575; H04L 63/0435; H04L 63/0442; H04L 63/061; H04L 63/0853
See application file for complete search history.

(56) References Cited

U.S. PATENT DOCUMENTS 7,600,134 B2 * 10/2009 Catherman ............. G06F 21/88
380/259
8,190,916 B1 * 5/2012 Wang .................... G06F 21/575
713/193
(Continued)

FOREIGN PATENT DOCUMENTS

WO 2007148258 A2 12/2007

OTHER PUBLICATIONS

Emanuel, Michael, "Tamper Free Deployment and Execution of Software using TPM", Retrieved from <<https://pdfs.semanticscholar.org/fad4/5d79054b22d86c4036c2f2283d45f7692741.pdf>>, Feb. 12, 2012, 63 Pages.
(Continued)

*Primary Examiner* — Eleni A Shiferaw
*Assistant Examiner* — Sher A Khan
(74) *Attorney, Agent, or Firm* — Jacob P. Rohwer; Newport IP, LLC

(57) ABSTRACT

The techniques and systems described herein are directed to providing targeted, secure software deployment in a computing system. An identity of the computing device can be determined and verified using a trusted platform module (TPM) of the computing device, and a software update can be expressly configured to operate solely on the computing device. Further, a configuration of the computing device can be ascertained using platform configuration registers (PCRs) of the TPM to determine that the computing device has not been modified from a trusted configuration. For example, if malware or unauthorized software is operating on the computing device, the software update may be prevented from being installed. Further, the software update can be targeted for a particular computing device, such that when the software update is received at the computing device, the software update may not be duplicated and provided to an additional, unauthorized device.

19 Claims, 9 Drawing Sheets

(56) References Cited

U.S. PATENT DOCUMENTS

| | | | |
|---|---|---|---|
| 8,522,018 B2 | 8/2013 | Molina et al. | |
| 9,252,946 B2 | 2/2016 | Ranghuram et al. | |
| 9,367,697 B1* | 6/2016 | Roth | G06F 21/602 |
| 2002/0026576 A1* | 2/2002 | Das-Purkayastha | G06F 21/552 |
| | | | 713/156 |
| 2003/0023872 A1* | 1/2003 | Chen | G06F 21/57 |
| | | | 726/25 |
| 2005/0021968 A1 | 1/2005 | Zimmer et al. | |
| 2005/0132177 A1* | 6/2005 | Challener | G06F 21/575 |
| | | | 713/1 |
| 2006/0095505 A1 | 5/2006 | Zimmer et al. | |
| 2006/0161784 A1* | 7/2006 | Hunter | G06F 21/575 |
| | | | 713/182 |
| 2008/0244569 A1* | 10/2008 | Challener | G06F 21/57 |
| | | | 718/1 |
| 2008/0270781 A1 | 10/2008 | Ibrahim et al. | |
| 2009/0013406 A1* | 1/2009 | Cabuk | G06F 21/57 |
| | | | 726/22 |
| 2009/0064292 A1* | 3/2009 | Carter | G06F 21/33 |
| | | | 726/5 |
| 2009/0070598 A1* | 3/2009 | Cromer | G06F 21/575 |
| | | | 713/193 |
| 2010/0095120 A1 | 4/2010 | Thom et al. | |
| 2012/0151199 A1* | 6/2012 | Shriver | G06F 21/575 |
| | | | 713/2 |
| 2013/0047197 A1 | 2/2013 | Saroiu et al. | |
| 2013/0086383 A1* | 4/2013 | Galvao de Andrade | H04L 9/0897 |
| | | | 713/171 |
| 2013/0318357 A1 | 11/2013 | Abraham et al. | |
| 2014/0222813 A1* | 8/2014 | Yang | G06F 17/30861 |
| | | | 707/736 |
| 2014/0310510 A1 | 10/2014 | Potlapally et al. | |
| 2015/0121070 A1 | 4/2015 | Lau et al. | |
| 2015/0188944 A1* | 7/2015 | Dyer | H04L 63/20 |
| | | | 726/3 |
| 2016/0048694 A1* | 2/2016 | Martinez | G06F 21/606 |
| | | | 713/193 |
| 2018/0026969 A1* | 1/2018 | Newton | G03G 15/0863 |

OTHER PUBLICATIONS

"International Search Report and Written Opinion Issued in PCT Application No. PCT/US2017/038888", dated Sep. 20, 2017, 14 Pages.

Chen, et al., "cTPM: A Cloud TPM for Cross-Device Trusted Applications", In Proceedings of the 11th USENIX Symposium on Networked Systems Design and Implementation, Apr. 2, 2014, 15 pages.

* cited by examiner

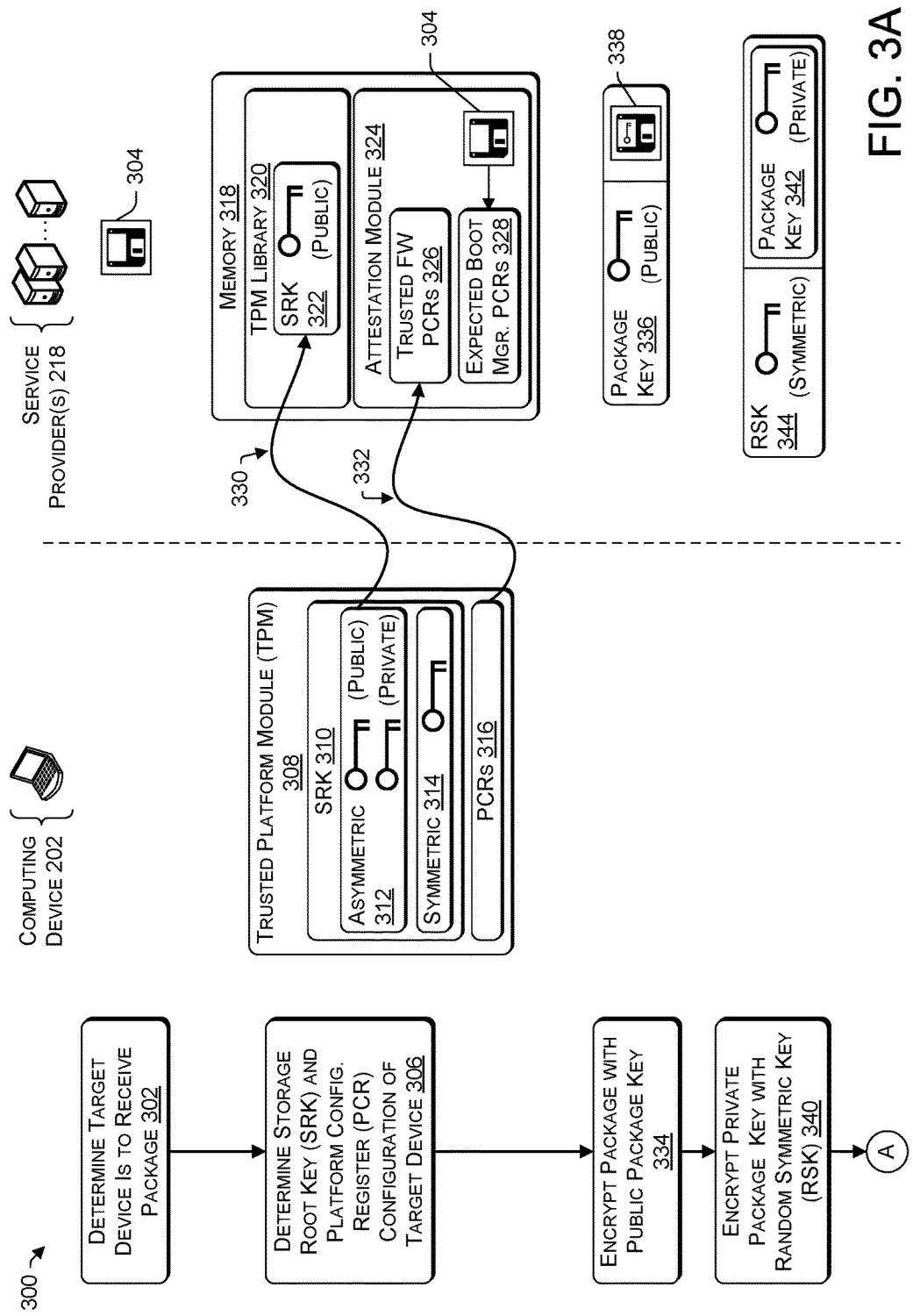

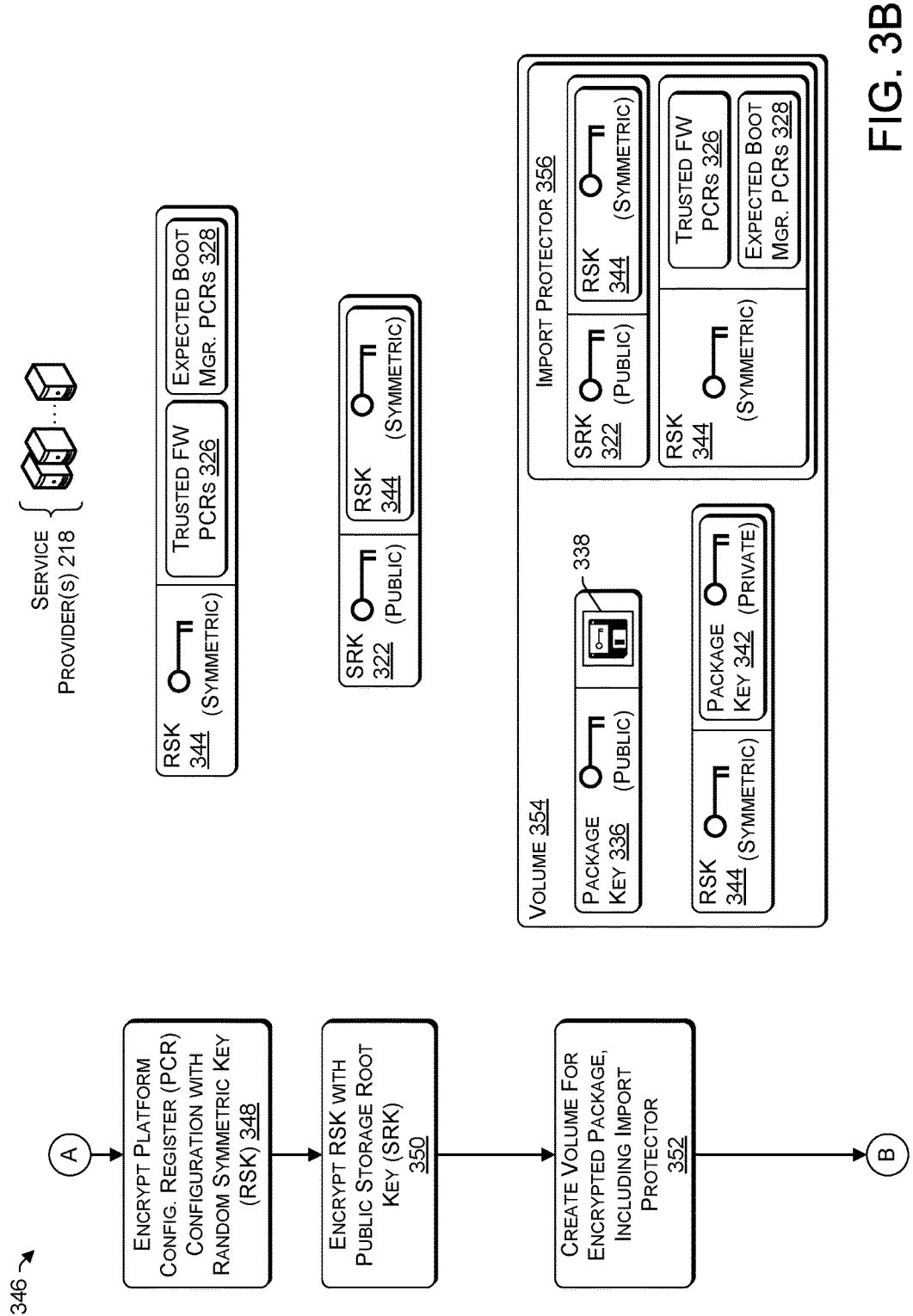

TARGETED SECURE SOFTWARE DEPLOYMENT

BACKGROUND

Software such as an operating system can be installed on a computing device by a device manufacturer and can operate on the computing device to provide a variety of functions. If a user wishes to perform a factory reset on a device or wishes to upgrade the operating system with new capabilities, the user may have to use physical media provided by the device manufacturer to install new software. However, in some cases, software can be delivered remotely over a network from the device manufacturer, or within an enterprise from a computing administrator, to the computing device. In such scenarios, the computing device may need a number of mechanisms to determine that security of the software has not been compromised. Further, such remote software delivery often exposes the data to being leaked or to unauthorized duplication of the software.

SUMMARY

The techniques and systems described herein enable targeted, secure software deployment in a computing environment. The techniques and systems described herein help verify that a computing device is an authorized computing device that has not been altered or compromised by malware, and help prevent the software from being duplicated or provided to unauthorized parties before or after any installation on the authorized computing device.

In some scenarios, software to be installed on a computing device requires a high level of security not provided by conventional installation techniques. Conventionally, sending a technician to verify an identity of a computer, verify that the computer has not been modified, install software from a secure memory module (e.g., an encrypted hard drive), and verify that no copies of the software are distributed beyond an intended device is expensive and not feasible on a wide scale. Using the techniques and systems described herein, an administrator can protect data or software using various complex encryption schemes to provide software to a computing device that cannot be installed on the device if the device has been tampered with, and that cannot be installed on an unauthorized device.

In some instances, a service provider can utilize one or more encryption keys (such as a storage root key (SRK)) associated with a trusted platform module (TPM) of the computing device to encrypt a software update in a protected manner. Because the TPM can be physically bound to the computing device (e.g., a target device), only the target device will be able to access the software update provided by the service provider. In some instances, the TPM can be provided as a service to a computing device.

To verify that the target device has not been compromised with malware, for example, the service provider can create a series of policies to verify that a state of the target device has not changed from a known, trusted configuration. Various platform configuration registers (PCRs) within the TPM can be used to determine various "fingerprints" or signatures indicating the firmware, software, and hardware associated with the target device. The policies included in the software update can include a fingerprint of various firmware, software, and hardware configurations of the target device such that if the target device has not been altered, fingerprints of the target device (e.g., determined at run time) will match fingerprints provided by the service provider to unlock the software update. The service provider can generate an expected fingerprint associated with a software update to further verify that the software update to be installed on the target computer operates correctly. As the software update is loaded into a boot manager at the target device, run time fingerprints associated with the software update can be compared with expected fingerprints generated by the service provider to further verify that a configuration of the computing device remains in a trusted configuration. Thus, by verifying an identity of the target device and by verifying that the target device has not been altered from a trusted configuration, the integrity of the target device and the software update provided to the target device can be maintained during remote software deployment.

Following a verification of the identity of the target device and the configuration of the target device, the software update can be imported to the trusted platform module (TPM) of the target device. For example, the software update can be decrypted using various keys between the service provider and the TPM of the target device, and encrypted using a symmetric storage root key (SRK) of the target device. Thus, the software update can be further protected by being bound to the TPM and the target device, which helps prevent unauthorized distribution of the software update.

The targeted, secure software deployment discussed herein can improve a functioning of a computer by improving security, by preventing unauthorized software from operating on the computing device, and by preventing software from operating on computing devices other than a target device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 3A-3D illustrate a pictorial flow diagram of a process for implementing the targeted secure software deployment in a computing environment.

DETAILED DESCRIPTION

Figure 1:
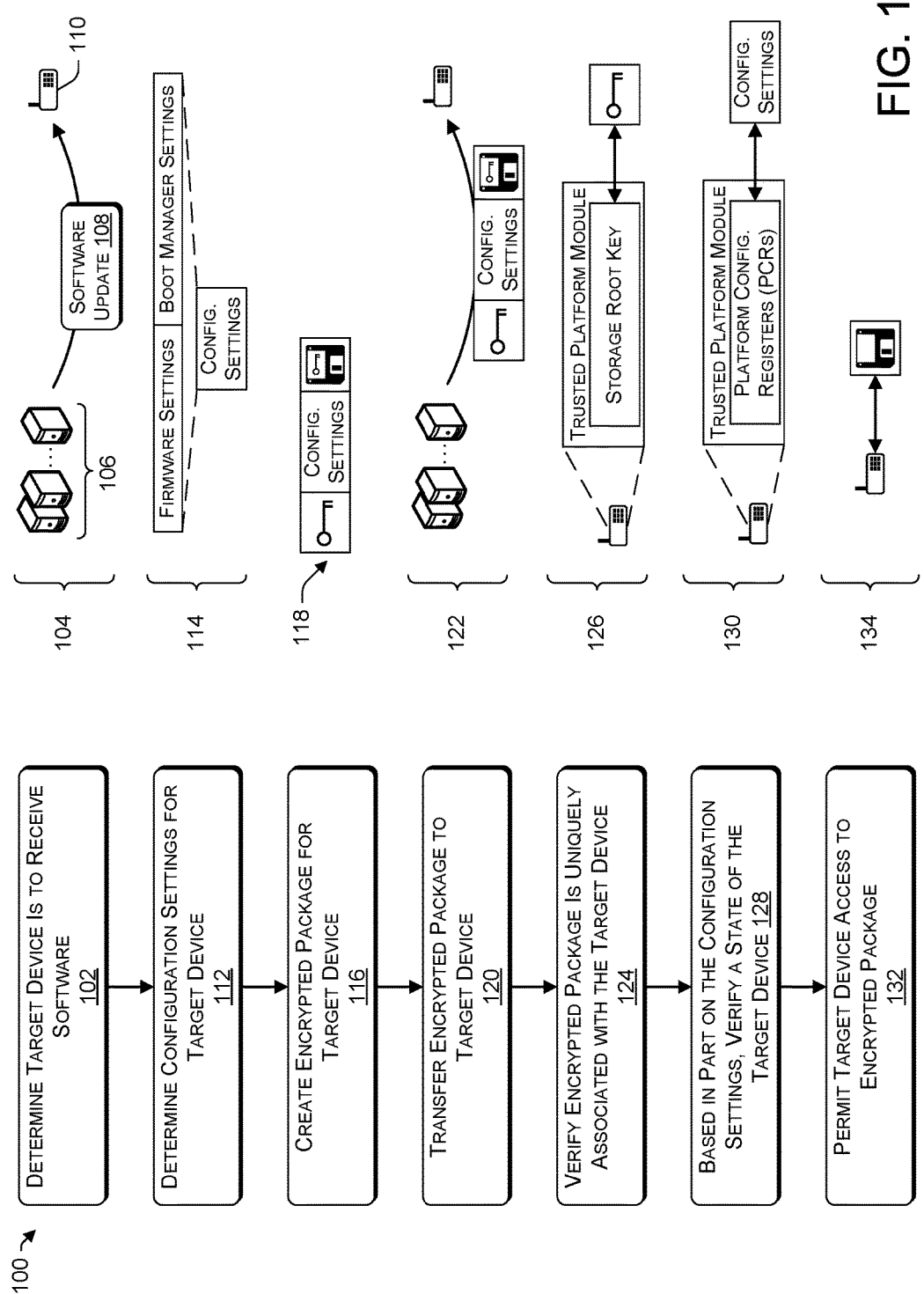
FIG. 1 illustrates a pictorial flow diagram of a process for targeted secure software deployment in a computing environment.

The techniques and systems described herein provide targeted secure software deployment. For example, software updates can be provided to a computing device when the computing device is located remotely from a service provider or a software repository. An identity of the computing device can be determined and verified using a trusted platform module (TPM) of the computing device, and a software update can be expressly configured to operate solely on the computing device. Further, a configuration of the computing device can be ascertained to determine that the computing device has not been modified, tampered with, or otherwise altered in any way. For example, if malware or unauthorized software is operating on the computing device, the software update may be prevented from being installed. Further, the software update can be targeted for a particular computing device, which may also be referred to as a target device. Thus, when the software update is received at the target device, the software update may not be duplicated and provided to an additional, unauthorized machine.

In one particular implementation, the targeted, secure software deployment discussed herein can be used to provide software updates to sensors in an Internet of Things (IoT) environment. As an IoT environment may include any number of remotely-located sensors, it can be important to have a means to remotely and securely update software, parameters, and/or a configuration of the sensors in a trusted manner to verify the integrity of the device and to verify the integrity of the provided software. By way of example and without limitation, an occupancy sensor can be located in a parking garage and the occupancy sensor can be configured to determine an occupancy of a particular area of the parking garage. In some instances, if the software of the sensor is to be updated, rather than sending a technician to the sensor to update the software, the software can be provided remotely (e.g., via a wired or wireless network) from a service provider to the sensor. The software can be encrypted and/or provisioned to operate on the sensor and no other device. Further, the software can be encrypted to prevent any unauthorized tampering of the software during transit and to verify the security and integrity of the contents. When the software is received by the sensor, a state of the sensor can be determined prior to installing the software. After the state of the sensor is determined (e.g., to be free from malware or unauthorized changes), the software update can be applied to the sensor. Further, because the software update can be uniquely associated with the sensor, the software update is prevented from unauthorized duplication and/or distribution.

A service provider can prepare a software update that is uniquely associated with a computing device (or sensor) via a trusted platform module (TPM). In some instances, the TPM is a dedicated microprocessor physically bound to a computing device that includes one or more cryptographic keys. In some instances, the TPM can be provided as a service to a computing device. Each TPM includes an endorsement key that uniquely identifies the TPM, and accordingly, the TPM uniquely identifies the computing device. The TPM can also include one or more storage root keys (SRKs) that can be configured to uniquely identify a user of the TPM and the computing device. The SRKs can include an asymmetric key (e.g., including public and private keys) that can be used to provide data uniquely accessible by the computing device. Further, the TPM can include a symmetric SRK that can be used by the TPM to access data associated with the TPM. In some instances, the symmetric SRK is never shared outside of the TPM.

The TPM can include one or more platform control registers (PCRs) that can create a nearly unforgeable hash key summary of the firmware, software, and hardware configuration of the computing device. In at least one example, the computing device can provide the hash key summary to a third party (e.g., the service provider) as a baseline measurement to verify that software on the computing device has not been altered with malware, for example. At each startup of the computing device, the TPM can measure the firmware PCRs and compare the hash key summary with a known value to determine that the computing device remains uncompromised. Thus, the keys of the TPM can uniquely identify the identity of the TPM, while the PCRs can uniquely identify a state of the computing device (e.g., whether the firmware, software, or hardware of the device has been altered).

The service provider can include a remote computing system to provide a software update to a target device, in accordance with embodiments of the disclosure. In some instances, the service provider can store an identity of computing devices associated with the service provider, as well as an initial configuration setting (e.g., a "fingerprint") of the device associated with a trusted configuration of the target device. That is to say, the service provider can identify the platform control registers (PCRs) of the target device corresponding to a trusted firmware, software, and hardware configuration of the target device. In some instances, the service provider can determine a software package to provide to the target device, and can determine one or more expected or anticipated configuration settings upon loading the software update on the target device. The service provider can prepare the software update in an encrypted package to provide to the target device. For example, the service provider can obtain an identity of the target device via one or more storage root keys (SRKs) associated with the TPM of the target device. The software update can be encrypted with a random symmetric key (RSK), and the encrypted software update and the configuration settings can be prepared in an import protector and encrypted using the public SRK associated with the asymmetric SRK of the TPM. The encrypted package can be provided to the target device for verification and/or installation.

The target device can receive the encrypted package via a network (such as the Internet) or by any means to transfer data. The encrypted package can be stored at the target device and processed to determine the validity of the data, as well as the integrity of the target device, prior to installation. The encrypted package can be decrypted using the private SRK of the target device, and the firmware fingerprint (e.g., PCR values associated with firmware or a BIOS (basic input/output system)) of the target device can be verified as unchanged. In some instances, the private SRK of the target device can decrypt the random symmetric key (RSK) associated with the encrypted data. In some instances, the software update can be provided to the target device in an encrypted form such that data is stored in a memory associated with the target device in an encrypted form. Thus, in some instances, the encrypted package can include any number of keys to provide varying levels of security and/or encryption for the data.

Upon determining that the firmware PCRs of the target device indicate that the target device is to be trusted, the software update can be imported into the target device using an import protector associated with the encrypted package. For example, the software package can encrypted, sealed, and/or wrapped using the symmetric SRK of the target device, which verifies that the software cannot be migrated to another device, and allows the TPM of the target device to use the software update. In some instances, the import operation can include generation of an individual protector, which binds the software to the target device. After the encrypted package is imported to the target device, the import protector associated with the software update can be deleted to save memory and further prevent unauthorized distribution.

The techniques and systems described herein can improve a functioning of a computing device by improving security of transmitting data, ensuring that data is accessible only to trusted devices, and preventing unauthorized distribution of software from a target device. For example, data encrypted during transmission cannot be intercepted and decrypted during transmission by an unauthorized party, while verifying a state of a target device prior to installation of a software update protects secrets from being distributed after installation. Binding a software update to a target device prevents software or data from being leaked (or otherwise transmitted) to an unauthorized device after the software has been provided to a target device.

Various examples for implementing the targeted secure software deployment in a computing environment are described herein with reference to FIGS. 1-6.

FIG. 1 illustrates a pictorial flow diagram of a process 100 for targeted secure software deployment in a computing environment. FIG. 1 illustrates a high-level pictorial flow diagram, and additional details of the implementation are given throughout this disclosure.

At 102, the operation can include determining that a target device is to receive software. For instance, example 104 illustrates a service provider 106 providing a software update 108 to a target device 110. In some embodiments, the operation 102 can include receiving a request at the service provider 106 from the target device 110 to provide the software update 108. In some embodiments, the operation 102 can include receiving an indication that the software update 108 is available for the target device 110 and initiating the software update 108 at the service provider 106. In some instances, the determination to provide the software update 108 to the target device 110 can be based in part on determining that firmware, software, and/or hardware of the target device 110 has been compromised. That is to say, in some instances, the software update 108 can be provided upon determining that one or more platform configuration register (PCR) values of the target device 110 does not correspond to a trusted state.

At 112, the operation can include determining one or more configuration settings for the target device 110. Configuration settings 114 are represented as including firmware settings and boot manager settings, although any quantitative or qualitative settings can be used as the configurations settings 114. For example, the service provider 106 can store a record of PCR values that correspond to a trusted state of the target device 110. In some instances the trusted state of the target device 110 can be determined at least in part on an identity (e.g., one or more keys) of a trusted platform module (TPM) associated with the target device 110. In some instances, the operation 112 can include determining one or more expected or anticipated PCR values that correspond to values or settings at the target device 110 at a time in which the software update 108 is installed at the target device 110 in a trusted configuration. That is, the operation 112 can include determining an expected fingerprint of the target device 110 (prior to the installation of the software update 108 on the target device 110) representing a state of the target device 110 with the installed software update 108 in which the firmware, software, and hardware of the target device 110 has not been altered from a trusted configuration.

In some instances, the configuration settings 114 for the target device 110 can correspond to one or more hash keys of the PCRs.

At 116, the operation can include creating an encrypted package for the target device 110. As illustrated, an encrypted package 118 may include a software update and one or more configuration settings 114 encrypted for use by the target device 110. In some instances, the encrypted package 118 is encrypted using a public storage root key (SRK) of the TPM, which can only be decrypted using the private SRK of the TPM. In some instances, the encrypted package 118 can include an import protector configured to allow the TPM of the target device 110 to import the encrypted package 118 into the target device 110. As can be understood in the context of this disclosure, the use of encryption keys associated with a TPM of the target device 110 can prevent unauthorized devices from accessing the software update 108. Further, because the encryption key (e.g., the SRK) can be unique to the TPM, the service provider 106 can be confident that only the target device 110 can access the encrypted package 118.

At 120, the operation can include transferring the encrypted package 118 to the target device 110. Example 122 illustrates the encrypted package 118 being transferred from the service provider 106 to the target device 110. In some instances, the encrypted package 118 can be transferred via any wired or wireless network to the target device 110. In some instances, the encrypted package 118 can be stored on a memory device, such as a hard drive, USB flash drive, CD-ROM, etc., physically transported to the target device 110, and transferred to the target device 110.

At 124, the operation can include verifying that the encrypted package 118 is uniquely associated with the target device 110. As illustrated in example 126, a key associated with the encrypted package 118 can be compared with a storage root key (SRK) of the trusted platform module (TPM), for example. As the SRK is uniquely associated with the TPM, which in turn is bound to the target device 110, for example, the target device 110 is the only device that can decrypt the encrypted package 118. In some instances, any device other than target device 110 attempting to access the encrypted package 118 may be denied access.

At 128, the operation can include verifying a state of the target device 110, based at least in part on the configuration settings 114 in the encrypted package 118. As illustrated in example 130, the configuration settings 114 from the encrypted package 118 can be compared with one or more values associated with the platform configuration registers (PCRs) of the target device 110. For example, the TPM can compare firmware PCRs present in the target device 110 with the firmware PCRs provided in the configuration settings 114. Further, the TPM can compare PCRs associated with a boot manager (e.g., in connection with loading the software update 108) into the target device 110 to determine a state of the target device 110. If the PCR measurements do not match the configuration settings 114, then the target device 110 may be compromised, and the target device 110 may be barred from further accessing the encrypted package 118.

If the operation 128 verifies that the target device 110 is to be trusted (e.g., no malware is present and/or firmware or software has not been modified), at 132, the operation can include permitting the target device 110 to access the encrypted package 118. Example 134 illustrates the target device 110 having access to the software update 108 included in the encrypted package 118. In some instances, the software update 108 can be protected by disk encryption when stored on the target device 110, such that only the target device 110 can access the software update 108.

Figure 2:
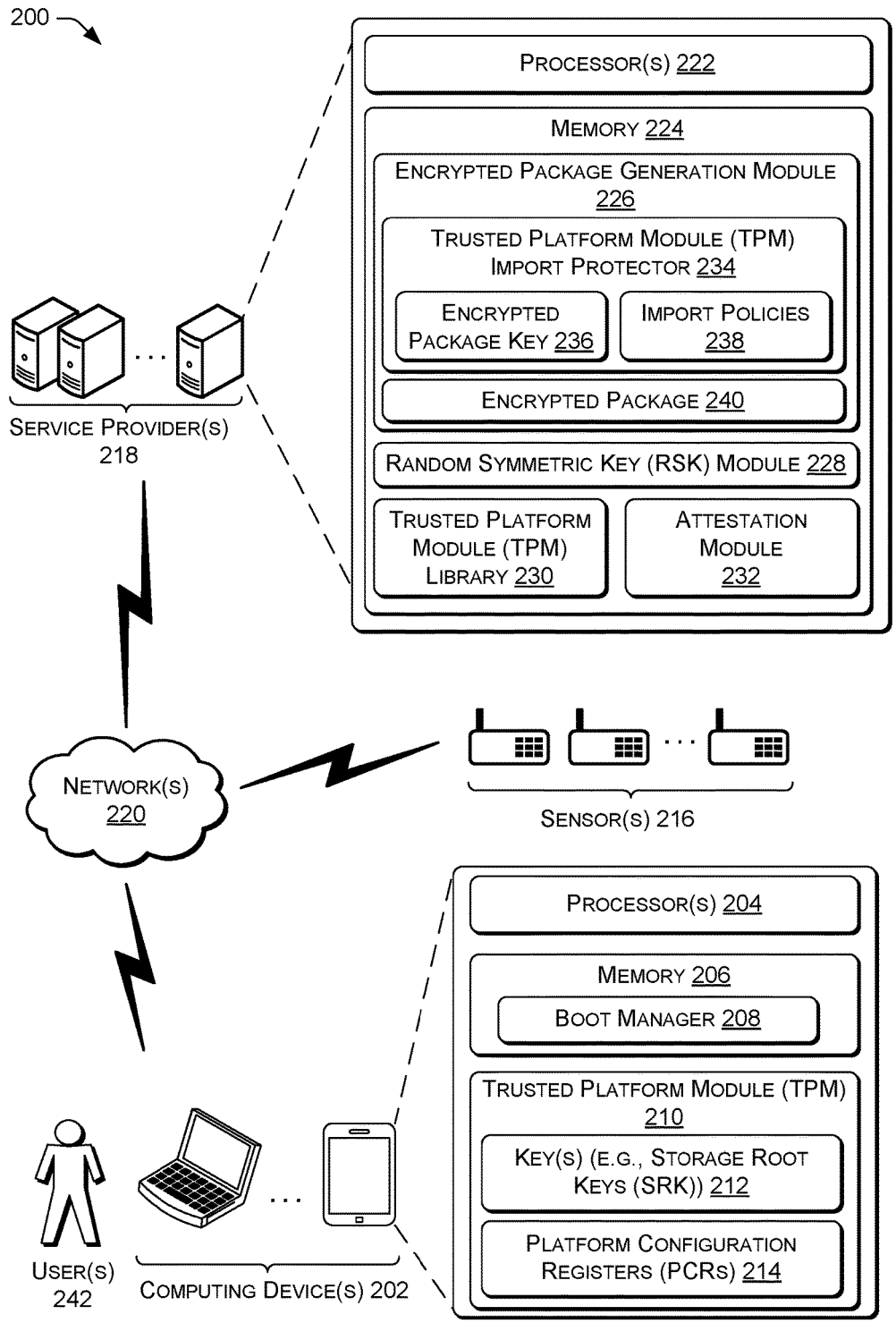
FIG. 2 illustrates an example environment for implementing the targeted secure software deployment.

FIG. 2 illustrates an example environment 200 for implementing the targeted secure software deployment. The environment 200 includes computing device(s) 202 having processor(s) 204 and a memory 206 including a boot manager 208. In various instances, the boot manager 208 can perform operations to boot any operating system or software of the computing device 202 and to provide indications of the operations to a trusted platform module (TPM) 210. In some instances, the trusted platform module (TPM) 210 can include one or more keys 212, including but not limited to storage root key(s), and one or more platform configuration registers (PCRs) 214. The environment 200 also includes one or more sensor(s) 216 that can generate data to provide to one or more service provider(s) 218 via the computing device(s) 202 and/or a network 220. In some instances, the service provider(s) 218 provide one or more services to the computing device 202, such as upgrading software associated with the computing device 202 and/or the sensors 216. To that end, the service provider 218 can include processor(s) 222 and a memory 224 including an encrypted package generation module 226, a random symmetric key (RSK) module 228, a trusted platform module (TPM) library 230, and an attestation module 232. The encrypted package generation module 226 can include (and/or generate) a trusted platform module (TPM) import protector 234, an encrypted package key 236, one or more import policies 238, and an encrypted package 240.

The computing device 202 can include, but is not limited to, any one of a variety of computing devices, such as a smart phone, a mobile phone, a personal digital assistant (PDA), an electronic book device, a laptop computer, a desktop computer, a tablet computer, a portable computer, a gaming device, a personal media player device, a server computer, a wearable device, or any other electronic device.

As introduced above, the computing device 202 can include one or more processor(s) 204 and memory 206. The processor(s) 204 can be a single processing unit or a number of units, each of which could include multiple different processing units. The processor(s) 204 can include one or more microprocessors, microcomputers, microcontrollers, digital signal processors, central processing units (CPUs), graphics processing units (GPUs), security processors (e.g., secure cryptoprocessors), and/or other processors. Alternatively, or in addition, some or all of the techniques described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor(s) 204 can be configured to fetch and/or execute computer-readable instructions stored in the memory 206.

The memory 206 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PCM), Static Random-Access Memory (SRAM), Dynamic Random-Access Memory (DRAM), other types of Random-Access Memory (RAM), Read-Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The one or more sensor(s) 216 can also include a processor and memory similar to those described in connection with the computing device(s) 202, and can further include any processing, hardware, and/or circuitry to generate data to provide to the computing device 202 and/or to the service provider 218. In some instances, the one or more sensors(s) 216 can receive software updates in a similar manner as described in connection with the computing device 202.

In various embodiments, the computing device 202 and/or the sensors 216 can communicate with the service provider 218 via one or more wired or wireless networks 220, such as the Internet, a Mobile Telephone Network (MTN), or other various communication technologies. In some instances, the network 220 can include any WAN or LAN communicating via one or more wireless protocols including but not limited to RFID, near-field communications, optical (IR) communication, Bluetooth, Bluetooth low energy, ZigBee, Z-Wave, Thread, LTE, LTE-Advanced, WiFi, WiFi-Direct, LoRa, Homeplug, MoCA, Ethernet, etc.

In various embodiments, the memory 206 can include an operating system configured to manage hardware and services within and coupled to the computing device 202 for the benefit of other components and other devices.

The various components of the environment 200 can include hardware and/or software components. For example, the boot manager 208, the encrypted package generation module 226, the random symmetric key (RSK) module 228, the trusted platform module (TPM) library 230, and the attestation module 232 can be implemented by one or more modules stored in the memory 206 or 224, respectively, and/or by one or more components of the processor(s) 204 or 222, respectively. As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions can be implemented (e.g., performed) in whole or in part by hardware logic components, such as FPGAs, ASICs, ASSPs, state machines, CPLDs, other logic circuitry, SoCs, and so on.

The boot manager 208 can perform operations to load firmware, an operating system, and/or other software components into the memory 206 to be operated upon by the processor 204. In some instances, the boot manager 208 can operate in conjunction with the TPM 210 to determine a state of the firmware, software, and/or hardware in the computing device 202.

The trusted platform module (TPM) 210 can include a secure cryptoprocessor designed to secure the hardware and/or verify firmware or software of the computing device 202. In some instances, the TPM 210 can provide functions for the secure generation of cryptographic keys, which can be used to encrypt and decrypt data that is uniquely associated with the TPM 210 and correspondingly, uniquely associated with the computing device 202. In some instances, the keys 212 can include, but are not limited to, one or more of endorsement key(s), storage root key(s), attestation identity key(s), and/or storage key(s). In some instances, the endorsement key can be uniquely associated with the TPM 210 at a time of manufacturing the TPM 210. In some instances, various certificates and/or keys can be based in part on the endorsement key to uniquely encrypt, decrypt, or otherwise access data and/or software. Further, the TPM 210 can include platform configuration registers (PCRs) 214, which can include any number of registers (e.g., 16 or 24 registers, each register storing 20 bytes) to perform hashing operations to determine a unique hash key summary of firmware, software, and hardware operating on the computing device 202.

The encrypted package generation module 226 can perform operations to generate the TPM import protector 234 (including the encrypted package key 236 and the import policies 238) and the encrypted package 240, in accordance with embodiments of the disclosure. The encrypted package generation module 226 can operate in conjunction with the other modules of the service provider 218 to generate the encrypted package 240, which may correspond to a software update to provide to a target device, such as the computing device 202 or the sensor 216, for example. In some instances, the encrypted package 240 can be encrypted with a key such that the encrypted package 240 can be transmitted and stored in memory (e.g., memory 206) of the computing device 202. In some instances, the encrypted package 240 can be accessed by the TPM of the target device (e.g., the TPM 210 of the computing device 202) via the TPM import protector 234, which includes the encrypted package key 236 and the import policies 238. In some instances, the encrypted package key 236 can be based at least in part on one or more keys associated with the TPM 210 or the random symmetric key (RSK) module 228. In some instances, the TPM import protector 234 can include one or more import policies 238 that can set, determine, and/or control the conditions in which various keys are released and/or decrypted from the encrypted package 240 on the computing device 202. For example, the import policies 238 can specify one or more configuration settings for the TPM 210 of the computing device 202 (or sensor 216) to verify that firmware or software of the computing device 202 has not been compromised. In some instances, and as explained in more detail below, some or all of the TPM import protector 234 can be deleted, archived, or otherwise removed from the computing device 202 upon importation of the encrypted package 240 into the computing device 202.

The random symmetric key (RSK) module 228 can provide one or more random symmetric keys (RSKs) to the encrypted package generation module 226, to facilitate the generation of the encrypted package 240. In some instances, a different RSK can be generated for each encrypted package generated by the service provider 218.

The trusted platform library 230 can store indications of the various computing devices 202 and the sensors 216 associated with the service provider 218. For example, the trusted platform library 230 can store keys, certificates, identity information, configuration settings, etc. of the various devices. In some instances, the TPM library 230 can store configuration parameters of PCRs associated with various devices, at a time in which each device was in a trusted state. For example, the TPM library 230 can store firmware, software, and/or hardware PCRs associated with the TPM 210 in a trusted state (e.g., the service provider 218 can say with reasonable certainty that the computing device 202 or sensor 216 is free from malware, or is unaltered, etc.).

The attestation module 232 can perform operations to cryptographically prove to a certificate authority that a key in the TPM (such as an RSA key) is protected by a TPM that is trusted by a certificate authority. For example, the attestation module 232 can be used to establish trust between the service provider 218 and a device that the service provider 218 has never seen, or is not associated with. For example, a certificate authority can include endorsement certificates, which can be based on an endorsement key, for each TPM manufactured. The attestation module 232 can verify an identity of a TPM, or verify that another trusted authority trusts a TPM, which in turn can provide an amount of trust to allow the service provider 218 to provide software updates to any number of devices. Thus, the service provider 218 is not limited to providing services to devices that are associated with the service provider 218 (e.g., stored in the TPM library 230), and can be extended to provide trust for any number of devices.

The service provider 218 can include one or more computing devices, such as one or more desktop computers, laptop computers, servers, and the like. The one or more computing devices can be configured in a cluster, data center, cloud computing environment, or a combination thereof. In one example, the one or more computing devices provide cloud computing resources, including computational resources, storage resources, and the like, that operate remotely from the computing device 202.

The environment 200 also includes the one or more users 242 to employ the computing device 202. The one or more users 242 can interact with the computing device 202 (and/or the sensors 216) to perform a variety of operations.

The operations of these components are further explained in connection with FIGS. 1 and 3-6 of this disclosure.

FIGS. 3A-3D illustrate a pictorial flow diagram of a process for implementing the targeted secure software deployment in a computing environment.

Figure 3C:
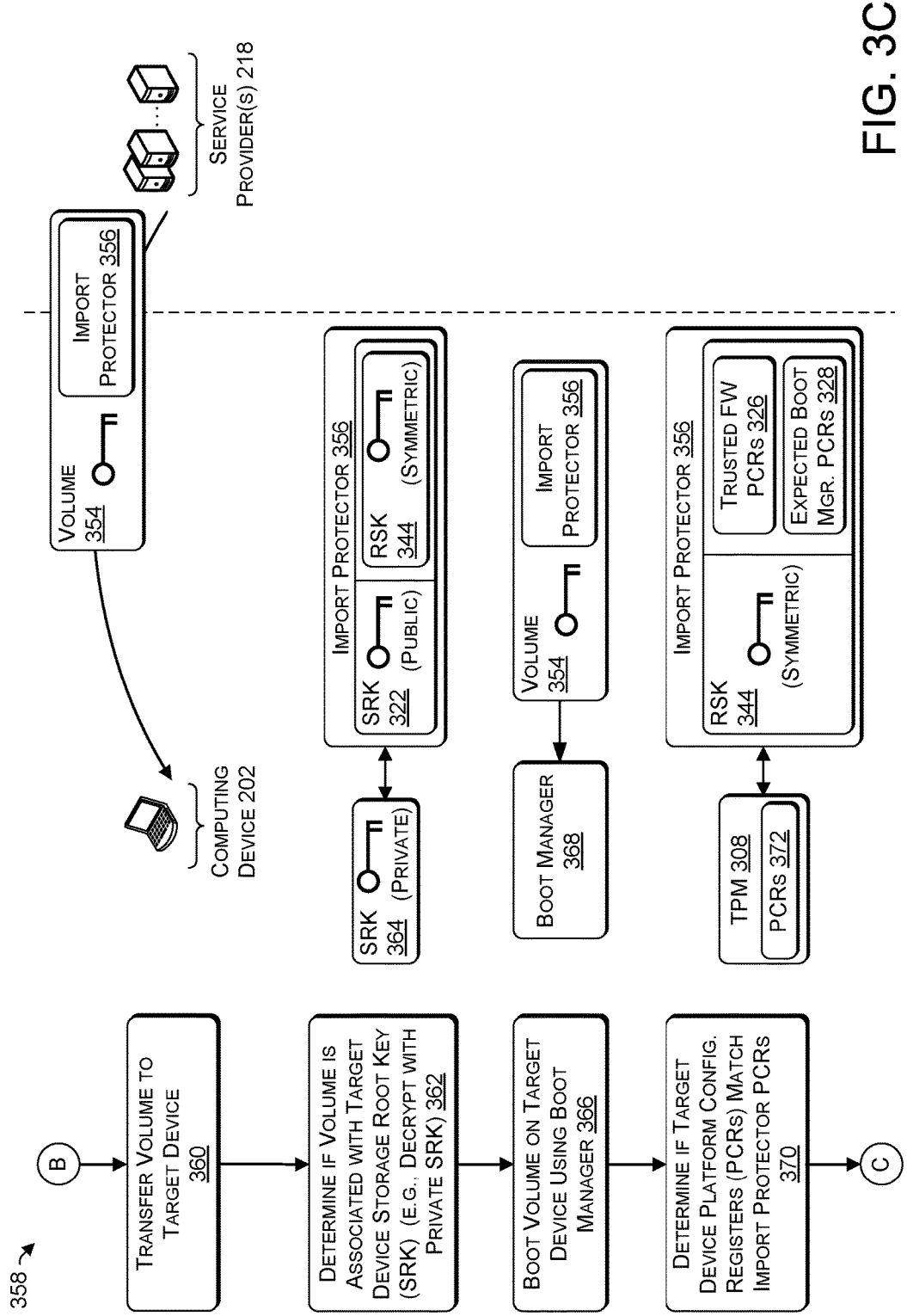

FIG. 3A illustrates initial operations 300 for implementing targeted secure software deployment. FIG. 3A illustrates operations between the computing device 202 and the service provider 218. In general, operations and/or components associated with the computing device 202 or the service provider 218 are provided below each illustration, respectively, although other implementations may be provided. In some instances, although FIG. 3A refers to the computing device 202, the operations of FIGS. 3A-3D can be performed between the service provider 218 and the sensor 216, for example, in an Internet of Things (IoT) environment.

At 302, the operation can include determining that a target device (e.g., the computing device 202) is to receive a package 304. In some instances, the package 304 can include a software update, such as an operating system for the computing device 202. The operation 302 can include receiving an indication that software associated with the computing device 202 is out of date (e.g., an early version of software) or is compromised and needs to be reinstalled. In some instances, the package 304 can correspond to any data to be provided to the computing device 202, and is not limited to software. For example, the package 304 can include any number of digital files, such as audio, text, and/or video.

At 306, the operation includes determining a storage root key (SRK) and determining a platform configuration registers (PCR) configuration of the target device. For example, a trusted platform module (TPM) 308 associated with the target device (e.g., the computing device 202) includes a storage root key 310 including an asymmetric key 312 (including a public key and a private key)) and a symmetric key 314. In some instances, the asymmetric key 312 (e.g., via the public key) can be used by the service provider 218 to encrypt information to be sent to the computing device 202, while the private key of the asymmetric key 312 can decrypt the encrypted information. The symmetric key 314 can encrypt information to be accessed by the TPM 308.

The TPM 308 includes one or more platform configuration registers (PCRs) 316, which can be used to determine configuration settings of the TPM 308. In some instances, the configuration settings associated with the PCRs 316 can be used to verify a state of the computing device 202, which can indicate whether any firmware, software, and/or hardware on the computing device 202 has been altered or compromised. In some instances, the TPM 308 can correspond to the TPM 210 of FIG. 2.

The public key of the asymmetric key 312 and/or the PCRs 316 can be provided to the service provider 218 and stored in memory 318. For example, the asymmetric key 312 of the SRK 310 can be represented in a TPM library 320 as a public SRK 322. In some instances the memory 318 can correspond to the memory 224 of FIG. 2.

An attestation module 324 stored in the memory 318 can include trusted firmware (FW) PCRs 326 and/or expected boot manager PCRs 328. In some instances, the trusted FW PCRs 326 can correspond to a signature of the firmware of the computing device 202 at a time when the computing device 202 was in a trusted environment, such as initialization. In some instances, as when a trust relationship has not yet been established between the computing device 202 and the service provider 218, the trusted FW PCRs 326 can be based on expected PCRs based upon a configuration of the computing device 202 and one or more keys of the TPM 308 (e.g., an endorsement key or an endorsement certificate provided by a certificate authority, and/or based upon one or more attestation identity keys).

In some instances, the expected boot manager PCRs 328 can correspond to expected PCR values based upon the package 304 to be provided to the computing device 202. For example, the service provider 218 can determine, based upon 1) a configuration of the software update, 2) firmware associated with the computing device 202, and/or 3) one or more SRKs, the PCR values 328 to be expected to be observed by the TPM at a time in which the package 304 is loaded into memory by a boot manager of the computing device 202.

Although FIG. 3A illustrates paths 330 and 332 from the TPM 308 of the computing device 202 to the memory 318 of the service provider 218, it is to be understood that the public SRK 322 and/or the trusted FW PCRs 326 can be determined by any means. That is to say, the paths 330 and 332 illustrate a logical relationship between elements of the TPM 308 and the memory 318, without necessarily representing a physical or virtual connection. For example, the public SRK 322 can be provided by the computing device 202 to the service provider at an initialization time. In some instances, the computing device 202 can provide the public SRK 322 to the service provider 318 upon a request by the service provider 318.

At 334, the operation can include encrypting the package 304 with a public package key, represented as public package key 336. Thus, in some embodiments, the package 304 can be represented as an encrypted package 338, which may remain encrypted when received by the computing device 202. For example, the computing device 202 can provide encryption to some or all of the data stored in memory using the public package key 336.

At 340, the operation can include encrypting the private package key with a random symmetric key (RSK). For example a private package key 342 can be encrypted with a symmetric RSK 344. Thus, the private package key 342 capable of decrypting the encrypted package 338 is encrypted by the symmetric RSK 344. In some instances, the symmetric RSK 344 can be generated by the RSK module 228 of FIG. 2.

Next, FIG. 3B illustrates further operations 346 for implementing the targeted secure software deployment, as discussed herein. As illustrated, operations in FIG. 3B can be performed by one or more components of the service provider 218.

At 348, the operation can include encrypting the platform configuration register (PCR) configuration with the random symmetric key (RSK) 344. Thus, as illustrated, the symmetric RSK 344 can encrypt the trusted FW PCRs 326 and the expected boot manager PCRs 328, determined in the operation 306.

At 350, the operation can include encrypting the symmetric RSK 344 with the public SRK 322. Thus, in this manner, the various keys and packages discussed herein are uniquely associated with the SRK 310 (and TPM 308) associated with the computing device 202.

At 352, the operation includes creating a volume 354 for the encrypted package, including generating an import protector. In general, the volume 354 can include, but is not limited to, the encrypted package 338 encrypted with the public package key 336, and the private package key 342 encrypted with the symmetric RSK 344. Further, the volume 354 can include an import protector 356, which can include the symmetric RSK 344 encrypted with the public SRK 322, and the trusted FW PCRs 326 and the expected boot manager PCRs 328 encrypted with the symmetric RSK 344. In some instances, a volume or package may refer to collections of data, while in some instances, a volume may comprise a package, and vice versa.

In some instances, because the public SRK 322 provides the outermost layer of encryption, only the private asymmetric key 312 of the SRK 310 can access the volume 354. In this manner, the import protector 356 (and the volume 354) can be uniquely associated with the TPM 308 such that only the TPM 308 associated with the computing device 202 can access the data.

FIG. 3C illustrates operations 358 for implementing the targeted secure software deployment. FIG. 3C illustrates the operations 358 between the computing device 202 and the service provider 218.

At 360, the operation includes transferring the volume 354 including the import protector 356 from the service provider 218 to the computing device 202. In some instances, the operation 360 can include transferring the volume 354 by any known means, including via wired or wireless networks. In some instances, the operation 360 can include receiving the volume 354 at the computing device 202.

At 362, the operation can include determining if the volume 354 is associated with the target device storage root key (SRK), which is to say, the operation 362 can include decrypting at least a portion of the volume 354 with a private SRK 364, corresponding to the public SRK 322. In some instances, the private SRK 364 can correspond to the private asymmetric key 312 of FIG. 3A. In some instances, if an unauthorized computing device receives the volume 354, the unauthorized computing device will not be able to access the volume 354 because the unauthorized computing device would not be associated with the private SRK 364.

At 366, the operation can include booting the encrypted volume 354 on the target device (e.g., the computing device 202) using a boot manager 368. For example, the boot manager 368 can perform operations to load at least a portion of the package 304 or the encrypted package 338 into a memory of the computing device 202.

At 370, the operation can include determining if the target device platform configuration registers (PCRs) match the PCRs associated with the import protector 356. For example, the target device can include PCRs 372 which may include FW PCRs and/or boot manager PCRs that have not been verified. By determining the PCRs 372 and comparing the generated PCRs 372 with the trusted FW PCRs 326 and/or the expected boot manager PCRs 328, the operation 370 can determine if a state of the computing device 202 has been altered (e.g., via malware, boot logger, key logger, etc.), or some aspect of the firmware, software, and/or hardware of the computing device 202 has changed. In some instances, the operation 370 can include any key management operations to decrypt various other keys and/or to apply keys to various encrypted data to gain access to various data.

Figure 3D:
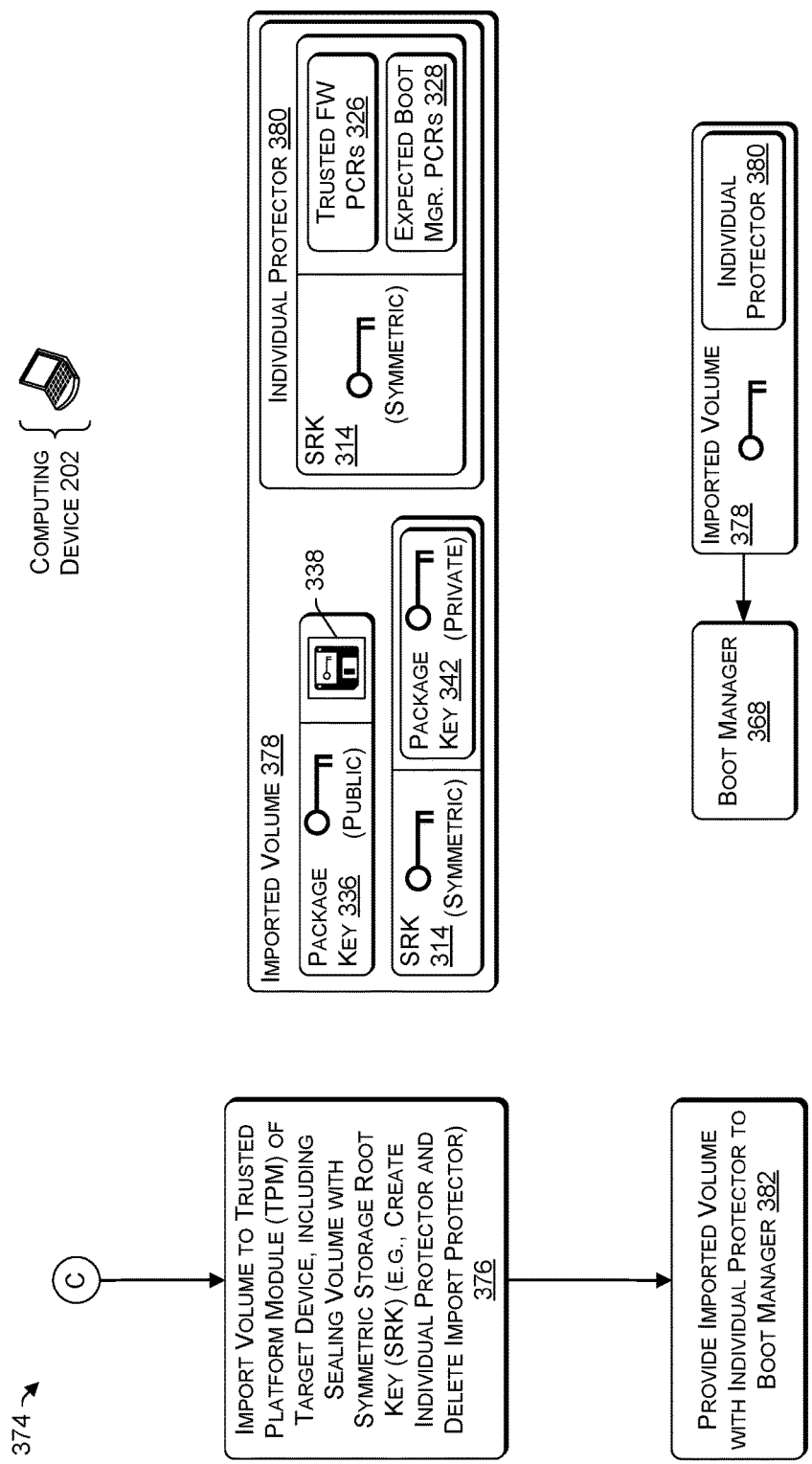

Continuing, FIG. 3D illustrates further operations 374 for implementing the targeted secure software deployment, as discussed herein. As illustrated, operations in FIG. 3D can be performed by one or more components of the computing device 202.

At 376, the operation can include importing the volume 354 into the trusted platform module (TPM) 308 of the target device (e.g., the computing device 202), which can include sealing the volume 354 with the symmetric storage root key (SRK) 314, thereby creating an imported volume 378. In some embodiments, the imported volume 378 can include the encrypted package 338 encrypted by the public package key 336, and the private package key 342 encrypted by the symmetric SRK 314. In this manner, the imported volume 378 is accessible only to the TPM 308 associated with the symmetric SRK 314.

The imported volume 378 can include an individual protector 380, which can replace the import protector 356 associated with the volume 354. The individual protector 380 can include the trusted FW PCRs 326 and/or the expected boot manager PCRs 328 encrypted with the symmetric SRK 314. Thus, the TPM 308 may solely access the individual protector 380.

At 382, the operation can include providing the imported volume 378 with the individual protector 380 to the boot manager 368. Accordingly, the boot manager 368 can boot at least a portion of the software update contained within the imported volume 378. As all aspects of the imported volume can be encrypted and accessible by the TPM 308 (and only the TPM 308, in some instances), the operations described herein improve a functioning of a computer by providing increased network security. Further, the package is provided to the target device without allowing unauthorized computing devices to gain access to the information contained therein, and the techniques and systems discussed herein prevent any unauthorized duplication or distribution of the data.

The example processes (e.g., in FIGS. 1, 3A-D, and 4-6) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 4:
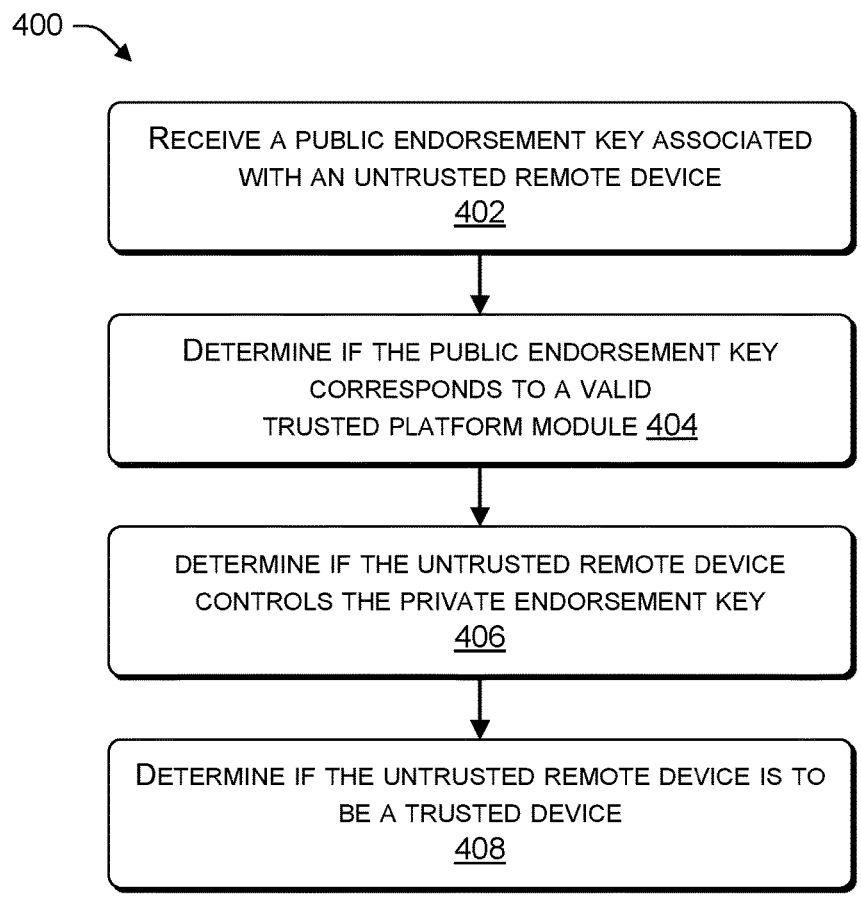
FIG. 4 is a process for attesting to a trustworthiness of a computing device.

FIG. 4 is a process 400 for attesting to a trustworthiness of a computing device. In one implementation, the process 400 can be performed by the service provider 218 of FIG. 2. However, processes can be performed in other environments and by other devices as well.

In some instances, the process 400 can be used to establish trust between an untrusted remote device (e.g., a computing device or a sensor) and a service provider. By way of example, and without limitation, the process 400 may be used in a case where a worker loses his or her computing device while they are away from their office. The worker may acquire an untrusted computing device and may establish trust between that remote device and the service provider to allow the service provider to provide proprietary software or other data to the newly-trusted remote device.

At 402, the operation can include receiving a public endorsement key associated with an untrusted remote device. For example, the untrusted remote device can include a trusted platform module (TPM) that includes an endorsement key that uniquely identifies the untrusted remote device. In some instances, the public endorsement key can be provided by the untrusted remote device to the service provider.

At 404, the operation can include determining if the public endorsement key corresponds to valid trusted platform module. In some instances, this operation 404 can include verifying the validity of the public endorsement key via a certificate authority trusted by the service provider. In some embodiments, the certificate authority can store a certificate associated with the public endorsement key associated with the TPM of the untrusted remote device, and can confirm or deny whether the public endorsement key is associated with a valid TPM.

At 406, the operation can include determining if the untrusted remote device controls a private endorsement key corresponding to the public endorsement key. In some instances, the operation 406 can include any number of message operations between the untrusted remote device and the service provider, such as encrypting an indication using the public endorsement key, providing the encrypted indication to the untrusted remote device, and receiving the decrypted indication (or a response based on the indication) from the untrusted remote device.

At 408, if the untrusted remote device does not fail at the operations above, the operation can include determining that the untrusted remote device is to be a trusted device. Thus, in this manner as service provider can establish trust with an untrusted computing device or an untrusted sensor and perform the software update operations described herein, for example.

Figure 5:
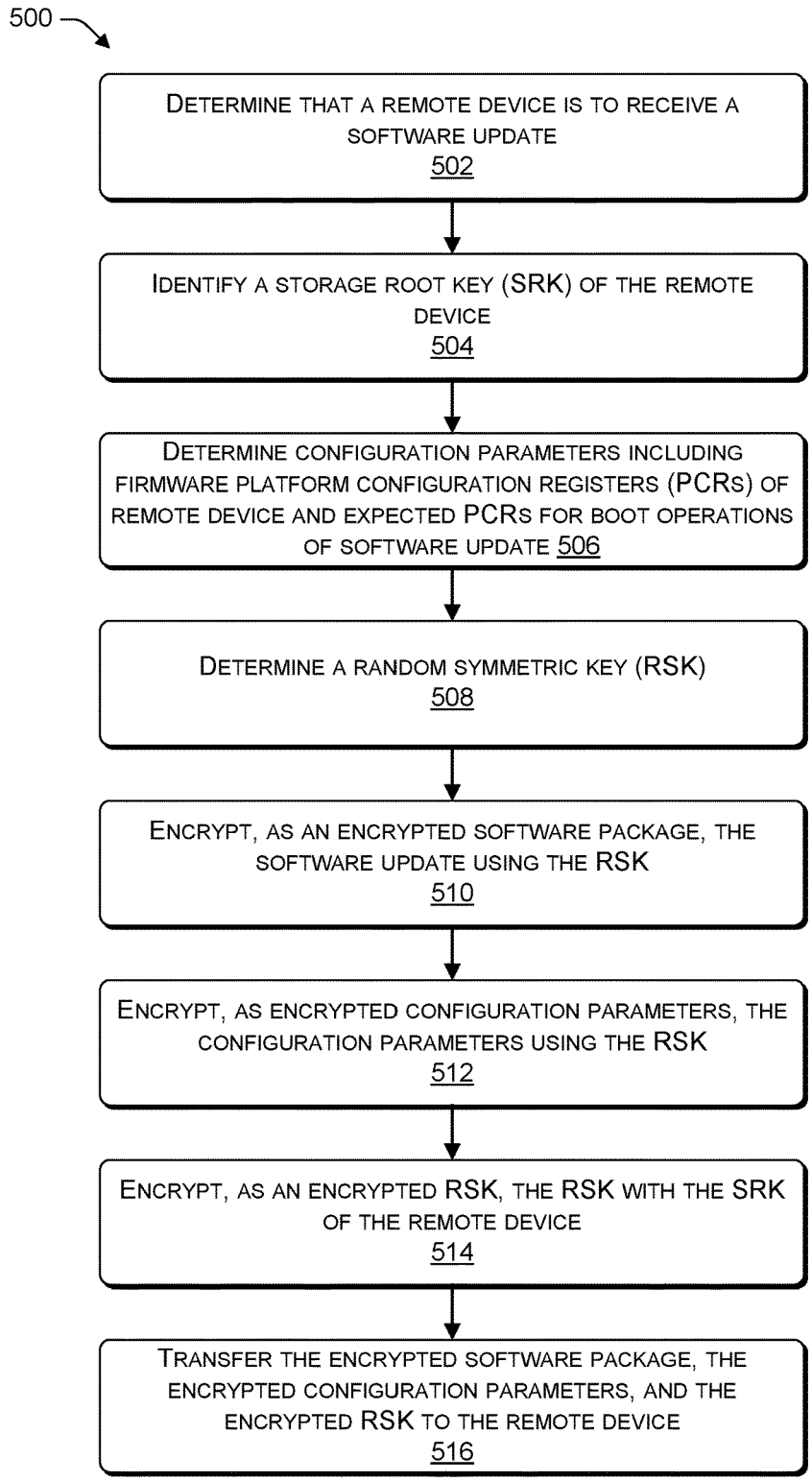
FIG. 5 is a process for determining that a computing device is to receive a software update and preparing an encrypted software package for the computing device.

FIG. 5 is a process 500 for determining that a remote device (e.g., a computing device or a sensor) is to receive a software update, and preparing an encrypted software package for the remote device. In one implementation, the process 500 can be performed by the service provider 218 of FIG. 2. Exemplary implementations of FIG. 5 are provided in connection with FIGS. 1 and 3A-3D, for example. However, processes can be performed in other environments and by other devices as well.

At 502, the operation can include determining that a remote device is to receive a software update. As discussed herein, the operation 502 can include determining a current version of software associated with the remote device and determining that an updated version is available. In some instances, this operation can include receiving a request from the remote device to provide updated software.

At 504, the operation can include identifying a storage root key (SRK) of the remote device. In some instances, the SRK of the remote device is a public key. In some instances, the service provider 218 can request the public SRK from the remote device, and in some instances, the remote device can initiate a transmission of the public SRK.

At 506, the operation can include determining one or more configuration parameters including firmware platform configuration registers (PCRs) of the remote device and one or more expected PCRs for boot operations of the software update. For example the firmware PCRs can include a signature or fingerprint of an operation of the remote device in a trusted state, such as during provisioning or initialization by the service provider 218. In some instances, the expected PCRs for boot operations of the software update are based on an expected digital signature in the PCRs of a trusted platform module (TPM) of the remote device, such that if the software update were to be provided to the remote device, and the remote device were to install the software, the expected PCRs would result.

At 508, the operation can include determining a random symmetric key (RSK). In some instances, a unique RSK can be provided for each software update and/or for each remote device. In some instances, determining the random RSK allows the software update to be encrypted in various operations.

At 510, the operation can include encrypting, as an encrypted software package, the software update using the RSK. As the RSK is a symmetric key, the encrypted software can be decrypted using the RSK as well.

At 512, the operation can include encrypting, as encrypted configuration parameters, the configuration parameters using the RSK. For example, the configuration parameters can include the configuration parameters determined in operation 506. Thus, based on the operations 510 and 512, both the software update and the configuration parameters can be encrypted using the same RSK.

At 514, the operation can include encrypting, as an encrypted RSK, the RSK with the SRK of the remote device. In some instances, the SRK of the remote device corresponds to the public SRK associated with the TPM of the remote device. Thus, following this operation 514, the software update and configuration parameters can be decrypted using the private SRK of the remote device. Therefore, the encrypted software is uniquely associated with the TPM of the remote device.

At 516, the operation can include transferring the encrypted software package, the encrypted configuration parameters, and the encrypted RSK to the remote device. For example, the encrypted software package, the encrypted configuration parameters, and the encrypted RSK can be provided as an encrypted volume accessible only to the TPM containing the private SRK. The encrypted volume can be provided to the remote device via any wired or wireless network, such the Internet, or via a memory module (e.g., a hard drive or USB storage device) transported to a location associated with the remote device. In this manner, the service provider 218 can prepare an encrypted volume to provide to a remote device.

Figure 6:
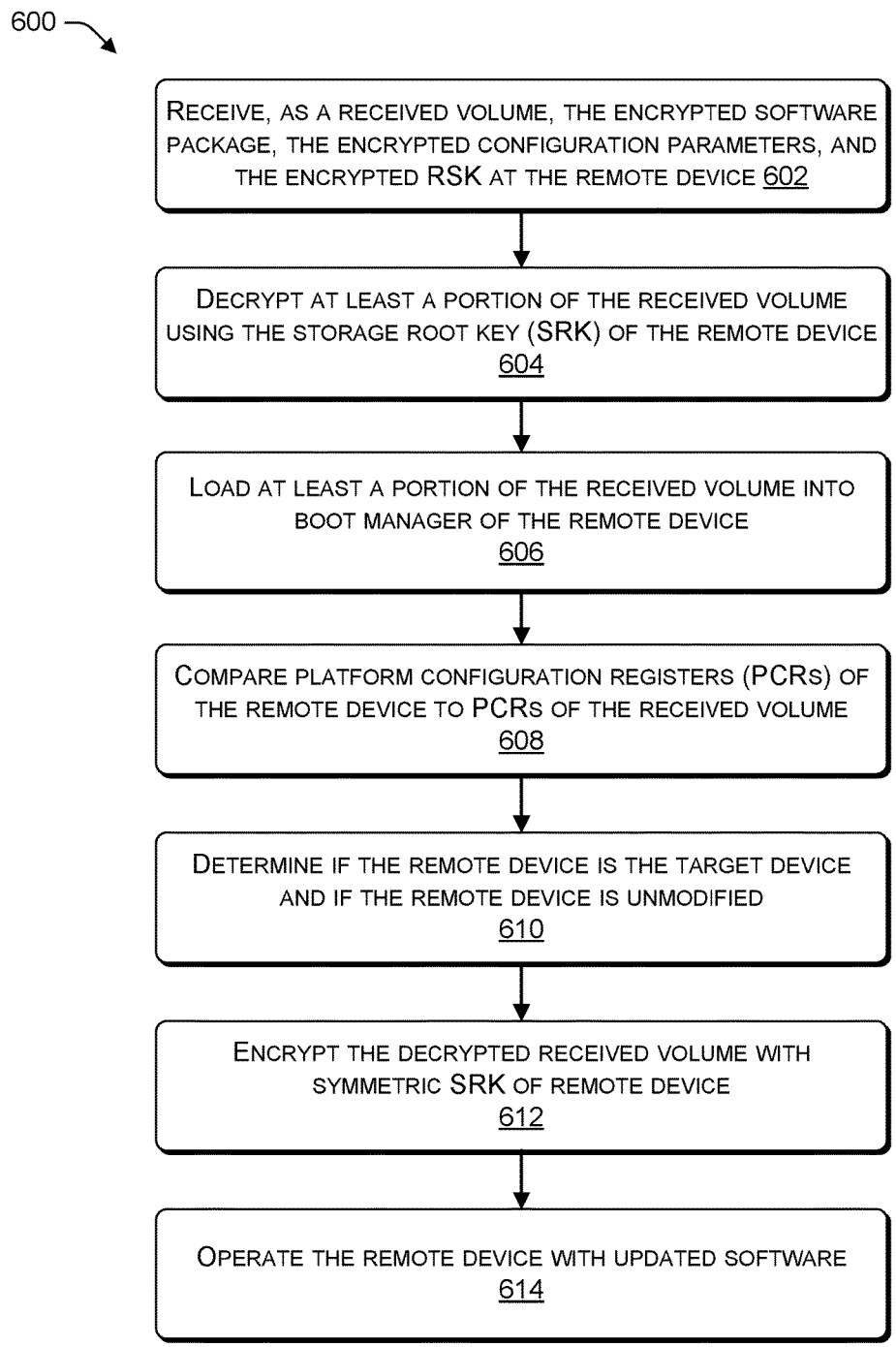
FIGS. 6 is a process for receiving an encrypted software package at a computing device and verifying that the computing device has not been compromised.

FIG. 6 is a process 600 for receiving an encrypted software package at a computing device and verifying that the computing device has not been compromised. In one implementation, the process 600 can be performed by the computing device 202 of FIG. 2. Exemplary implementations of FIG. 6 are provided in connection with FIGS. 1 and 3A-3D, for example. However, processes can be performed in other environments and by other devices as well.

At 602, the operation can include receiving, as a received volume, the encrypted software package, the encrypted configuration parameters, and the encrypted RSK at the remote device. In some instances, the received volume can be received via any wired or wireless network coupled to a remote device, such as the Internet. In some instances, the received volume can be transported to the remote device via a memory module, such as a hard drive.

At 604, the operation can include decrypting at least a portion of the received volume using the storage root key (SRK) of the remote device. In some instances, the remote device can use the private SRK to decrypt at least a portion of the received volume to confirm that the received volume is intended for the remote device. In a case where an unauthorized computing device receives the received volume, the unauthorized computing device will not be able decrypt a portion of the received volume because the unauthorized computing device lacks a private SRK corresponding to the public SRK that encrypted a portion of the received volume.

At 606, the operation can include loading at least a portion of the received volume into a boot manager of the remote device. For example, the operation 606 can include an initialization operation to generate one or more platform configuration register (PCR) values.

At 608, the operation can include comparing platform configuration register (PCRs) values of the remote device to PCR values of the received volume. For example, based on the PCRs determined in the operation 606, and based on the PCRs included in the received volume, the operation 608 can determine if there is a match between the trusted PCRs and the PCRs of the remote device.

At 610, the operation can include determining if the remote device is the target device and if the remote device is unmodified. In some instances, the remote device is the target device if the private SRK corresponds to the public SRK used to encrypt the received volume. In some instances, the remote device is unmodified if the PCRs of the remote device correspond to the PCRs of the received volume. That is to say, the FW PCRs of the remote device correspond to the trusted FW PCRs of the remote device and the boot manager PCRs correspond to the expected boot manager PCRs of the received volume.

At 612, the operation can include encrypting the decrypted received volume with the symmetric SRK of remote device. In some instances, this operation imports the received volume into the remote device such that the TPM of the remote device is required to access the received volume. In some instances, this operation 612 can include discarding, archiving, or deleting at least a portion of the received volume that is encrypted with the random symmetric key (RSK), and replacing those portions with data encrypted using the symmetric SRK.

At 614, the operation can include operating the remote device with the updated software. In some instances, this operation can include accessing the software update, installing the software update, and operating the device with the software update. In this manner, the techniques and systems described herein provide targeted secure software deployment in a computing environment.

Example Clauses

Example A, a system comprising: one or more processors; and memory storing modules that, when executed by the one or more processors, cause the system to perform operations comprising: determining that a remote device is to receive a software update; identifying a public storage root key (SRK) associated with the remote device; determining a first set of platform configuration registers (PCRs) associated with a trusted operation of firmware operating on the remote device; determining a second set of PCRs associated with an expected operation of at least a portion of the software update on the remote device; determining a random symmetric key (RSK); encrypting, as an encrypted software package, the software update using the RSK; encrypting, as encrypted configuration settings, the first set of PCRs and the second set of PCRs using the RSK; encrypting, as an encrypted RSK, the RSK with the public SRK of the remote device; and transferring the encrypted software package, the encrypted configuration settings, and the encrypted RSK to the remote device, wherein at least a portion of the encrypted software package is imported by the remote device based at least in part on a private SRK of the remote device.

Example B, the system of Example A, the operations further comprising: receiving a first indication from the remote device that the encrypted software package is uniquely associated with the remote device; and receiving a second indication from the remote device that the remote device is in a trusted state.

Example C, the system of Example A or Example B, the operations further comprising determining the first set of PCRs during an initialization of the remote device by the service provider.

Example D, the system of any one of Example A through Example C, wherein the public SRK of the remote device is associated with a trusted platform module (TPM) of the remote device.

While Example A through Example D are described above with respect to a system, it is understood in the context of this document that the content of Example A through Example D may also be implemented via a device, computer storage media, and/or a method.

Example E, a computer-implemented method comprising: receiving, at a device, an encrypted volume; decrypting at least a first portion of the encrypted volume based at least in part on a private storage root key (SRK) associated with the remote device; determining that the at least the first portion of the encrypted volume is uniquely associated with the device; determining that the device is in a trusted state; and importing, as an imported volume, at least a second portion of the encrypted volume to the device, the importing based at least in part on the private SRK of the device.

Example F, the computer-implemented method of Example E, wherein the encrypted volume includes at least an encrypted software package and one or more encrypted keys, and wherein the importing comprises at least: decrypting, as one or more decrypted keys, the one or more encrypted keys based at least in part on the private SRK of the device; decrypting, as a decrypted software package, at least a portion of the encrypted software package based at least in part on the one or more decrypted keys; and encrypting, as an imported software package, at least a portion of the decrypted software package based at least in part on a symmetric SRK associated with the device.

Example G, the computer-implemented method of Example F, wherein the importing further comprises deleting the at least the portion of the encrypted software package corresponding to the at least the portion of the decrypted software package encrypted in the imported software package.

Example H, the computer-implemented method of any one of Example E through Example G, wherein the encrypted volume includes at least one or more encrypted configuration settings and one or more encrypted keys, and wherein the determining that the device is in the trusted state includes: decrypting, as one or more decrypted keys, the one or more encrypted keys based at least in part on the private SRK of the device; decrypting, as decrypted configuration settings, at least a portion of the one or more encrypted configuration settings based at least in part on the one or more decrypted keys; comparing at least a first platform configuration register (PCR) configuration included in the decrypted configuration settings with at least a second PCR configuration determined by a trusted platform module (TPM) of the device; and determining that the at least the first PCR configuration corresponds to the at least the second PCR configuration.

Example I, the computer-implemented method of any one of Example E through Example H, further comprising determining that the device is in a trusted state based at least in part on platform configuration register (PCR) values associated with an operation of firmware of the device at a time of initializing the device.

Example J, the computer-implemented method of any one of Example E through Example I, further comprising: decrypting, as a decrypted portion, at least a portion of the encrypted volume based at least in part on the private SRK of the device; loading the decrypted portion into a boot manager of the device; and based at least in part on the loading, determining at least one platform configuration register (PCR) value associated with the boot manager.

Example K, the computer-implemented method of any one of Example E through Example J, further comprising establishing trust between the device and a service provider based at least in part on a public endorsement key associated with the device.

Example L, the computer-implemented method of any one of Example E through Example K, further comprising storing at least a portion of the imported volume in a memory of the device in an encrypted form.

Example M, the computer-implemented method of any one of Example E through Example L, wherein at least a portion of the computer-implemented method is performed in association with a trusted platform module (TPM) associated with the device.

Example N, the computer-implemented method of any one of Example E through Example M, further comprising: determining a set of platform configuration registers (PCRs) associated with a trusted operation of firmware operating on the device; encrypting the set of PCRs within the encrypted volume; and transmitting, by a service provider, the encrypted volume to the device.

Example O, the computer-implemented method of any one of Example E through Example N, further comprising: determining that the device is to receive a software update; determining a set of platform configuration registers (PCRs) associated with an expected operation of at least a portion of the software update on the device; encrypting the set of PCRs within the encrypted volume; and transmitting, by a service provider, the encrypted volume to the remote device.

While Example E through Example O are described above with respect to a method, it is understood in the context of this document that the content of Example E through Example O may also be implemented via a device, system, and/or computer storage media.

Example P, a system comprising: one or more processors; and memory storing modules that, when executed by the one or more processors, cause the system to perform operations comprising: receiving an encrypted volume; decrypting at least a first portion of the encrypted volume based at least in part on a private storage root key (SRK) associated with a device; determining that the at least the first portion of the encrypted volume is uniquely associated with the device; determining that the device is in a trusted state; and importing, as an imported volume, at least a second portion of the encrypted volume to the device, the importing based at least in part on the private SRK of the device.

Example Q, the system of Example P, wherein the encrypted volume includes at least an encrypted software package and one or more encrypted keys, and wherein importing comprises at least: decrypting, as one or more decrypted keys, the one or more encrypted keys based at least in part on the private SRK of the device; decrypting, as a decrypted software package, at least a portion of the encrypted software package based at least in part on the one or more decrypted keys; and encrypting, as an imported software package, at least a portion of the decrypted software package based at least in part on a symmetric SRK associated with the device.

Example R, the system of Example P or Example Q, the operations further comprising determining that the device is in a trusted state based at least in part on platform configuration register (PCR) values associated with an operation of firmware of the remote device at a time of initializing the device.

Example S, the system of any one of Example P through Example R, further comprising a plurality of sensors providing data to a service provider, the operations further comprising, determining, as the device, that at least one sensor of the plurality of sensors is to receive a software update.

Example T, the system of any one of Example P through Example S, the operations further comprising: determining that the device is to receive a software update; determining a set of platform configuration registers (PCRs) associated with an expected operation of at least a portion of the software update on the device; encrypting the set of PCRs within the encrypted volume; and transmitting, by a service provider, the encrypted volume to the device.

While Example P through Example T are described above with respect to a system, it is understood in the context of this document that the content of Example P through Example T may also be implemented via a device, computer storage media, and/or a method.

CONCLUSION

Although the present disclosure can use language that is specific to structural features and/or methodological operations, the disclosure is not limited to the specific features or operations described herein. Rather, the specific features and operations are disclosed as illustrative forms of implementing the disclosure.

What is claimed is:

1. A system comprising:
   one or more processors; and
   memory storing modules that, when executed by the one or more processors, cause the system to perform operations comprising:
      determining that a remote device is to receive a software update;
      identifying a public storage root key (SRK) associated with the remote device;
      determining a first set of platform configuration registers (PCRs) associated with a trusted operation of firmware operating on the remote device;
      determining a second set of PCRs associated with an expected operation of at least a portion of the software update on the remote device;
      determining a random symmetric key (RSK);
      encrypting, as an encrypted software package, the software update using the RSK;
      encrypting, as encrypted configuration settings, the first set of PCRs and the second set of PCRs using the RSK;
      encrypting, as an encrypted RSK, the RSK with the public SRK of the remote device; and
      transferring the encrypted software package, the encrypted configuration settings, and the encrypted RSK to the remote device, wherein at least a portion of the encrypted software package is imported by the remote device based at least in part on a private SRK of the remote device and after a determination that the first set of PCRs of the encrypted configurations settings correspond to firmware PCRs of the remote device and the second set of PCRs of the encrypted configurations settings correspond to boot manager PCRs of the remote device.

2. The system of claim 1, the operations further comprising:
   receiving a first indication from the remote device that the encrypted software package is uniquely associated with the remote device; and
   receiving a second indication from the remote device that the remote device is in a trusted state.

3. The system of claim 1, the operations further comprising determining the first set of PCRs during an initialization of the remote device by the service provider.

4. The system of claim 1, wherein the public SRK of the remote device is associated with a trusted platform module (TPM) of the remote device.

5. A computer-implemented method comprising:
   receiving, at a device and from a service provider an encrypted volume, wherein the encrypted volume includes one or more encrypted configuration settings and one or more encrypted keys;
   decrypting at least a first portion of the encrypted volume based at least in part on a private storage root key (SRK) associated with the device;
   determining that the at least the first portion of the encrypted volume is uniquely associated with the device;
   determining that the device is in a trusted state by:
      decrypting, as one or more decrypted keys, the one or more encrypted keys based at least in part on the private SRK associated with the device;

decrypting, as decrypted configuration settings, at least a portion of the one or more encrypted configuration settings based at least in part on the one or more decrypted keys;

comparing a first platform configuration register (PCR) configuration included in the decrypted configuration settings with a second PCR configuration determined by a trusted platform module (TPM) of the device; and determining that the first PCR configuration corresponds to the second PCR configuration; and importing, as an imported volume and based at least in part on the device being in the trusted state, at least a second portion of the encrypted volume to the device, the importing based at least in part on the private SRK of the device.

6. The computer-implemented method of claim 5, wherein the encrypted volume includes an encrypted software package, and wherein the importing comprises at least:

decrypting, as a decrypted software package, at least a portion of the encrypted software package based at least in part on the one or more decrypted keys; and encrypting, as an imported software package, at least a portion of the decrypted software package based at least in part on a symmetric SRK associated with the device.

7. The computer-implemented method of claim 6, wherein the importing further comprises deleting the at least the portion of the encrypted software package corresponding to the at least the portion of the decrypted software package encrypted in the imported software package.

8. The computer-implemented method of claim 5, further comprising determining that the device is in the trusted state based at least in part on platform configuration register (PCR) values associated with an operation of firmware of the device at a time of initializing the device.

9. The computer-implemented method of claim 5, further comprising:

loading the decrypted first portion of the encrypted volume into a boot manager of the device; and based at least in part on the loading, determining at least one platform configuration register (PCR) value associated with the boot manager.

10. The computer-implemented method of claim 5, further comprising establishing trust between the device and a service provider based at least in part on a public endorsement key associated with the device.

11. The computer-implemented method of claim 5, further comprising storing at least a portion of the imported volume in a memory of the device in an encrypted form.

12. The computer-implemented method of claim 5, wherein at least a portion of the computer-implemented method is performed in association with trusted platform module (TPM) of the device.

13. The computer-implemented method of claim 5, wherein the encrypted volume comprises a set of encrypted platform configuration registers (PCRs) associated with a trusted operation of firmware operating on the device.

14. The computer-implemented method of claim 5, wherein the encrypted volume is received based on a determination that the device is to receive a software update and the encrypted volume comprises a set of encrypted platform configuration registers (PCRs) associated with an expected operation of at least a portion of the software update.

15. A system comprising:

one or more processors; and memory storing modules that, when executed by the one or more processors, cause the system to perform operations comprising:

receiving an encrypted volume from a service provider, wherein the encrypted volume includes one or more encrypted configuration settings and one or more encrypted keys;

decrypting at least a first portion of the encrypted volume based at least in part on a private storage root key (SRK) associated with a device;

determining that the at least the first portion of the encrypted volume is uniquely associated with the device;

determining that the device is in a trusted state by:

decrypting, as one or more decrypted keys, the one or more encrypted keys based at least in part on the private SRK associated with the device;

decrypting, as decrypted configuration settings, at least a portion of the one or more encrypted configuration settings based at least in part on the one or more decrypted keys;

comparing a first platform configuration register (PCR) configuration included in the decrypted configuration settings with a second PCR configuration determined by a trusted platform module (TPM) of the device; and determining that the first PCR configuration corresponds to the second PCR configuration; and importing, as an imported volume based at least in part on the device being in the trusted state, at least a second portion of the encrypted volume to the device, the importing based at least in part on the private SRK of the device.

16. The system as recited in claim 15, wherein the encrypted volume includes an encrypted software package, and wherein importing comprises at least:

decrypting, as a decrypted software package, at least a portion of the encrypted software package based at least in part on the one or more decrypted keys; and encrypting, as an imported software package, at least a portion of the decrypted software package based at least in part on a symmetric SRK associated with the device.

17. The system as recited in claim 15, the operations further comprising determining that the device is in the trusted state based at least in part on platform configuration register (PCR) values associated with an operation of firmware of the device at a time of initializing the device.

18. The system as recited in claim 15, further comprising a plurality of sensors providing data to a service provider, the operations further comprising, determining that at least one sensor of the plurality of sensors is to receive a software update.

19. The system as recited in claim 15, wherein the encrypted volume is received based on a determination that the device is to receive a software update and the encrypted volume comprises a set of encrypted platform configuration registers (PCRs) associated with an expected operation of at least a portion of the software update on the device.

* * * * *